(12) United States Patent
Norberg et al.

(10) Patent No.: US 8,121,709 B2
(45) Date of Patent: *Feb. 21, 2012

(54) METHOD FOR COMPARING, AN AUTOMATION SYSTEM AND A CONTROLLER

(75) Inventors: Albert Norberg, Lund (SE); Stefan Sällberg, Malmo (SE)

(73) Assignee: ABB AB (SE)

( * ) Notice: Subject to any disclaimer, the term of this patent is extended or adjusted under 35 U.S.C. 154(b) by 325 days.

This patent is subject to a terminal disclaimer.

(21) Appl. No.: 12/202,853

(22) Filed: Sep. 2, 2008

(65) Prior Publication Data

US 2009/0069906 A1 Mar. 12, 2009

Related U.S. Application Data

(63) Continuation of application No. PCT/SE2007/000187, filed on Feb. 28, 2007.

(30) Foreign Application Priority Data

Mar. 2, 2006 (SE) ...................................... 0600449

(51) Int. Cl.
 *G05B 9/02* (2006.01)
(52) U.S. Cl. .................. 700/81; 700/4; 700/11; 700/79; 714/11; 714/32; 717/170
(58) Field of Classification Search ................. 700/4, 79, 700/81, 11; 714/32, 11; 717/170
 See application file for complete search history.

(56) References Cited

U.S. PATENT DOCUMENTS

| | | | |
|---|---|---|---|
| 5,491,625 A * | 2/1996 | Pressnall et al. | 700/4 |
| 6,788,980 B1 | 9/2004 | Johnson | |
| 6,951,017 B1 | 9/2005 | Dalton | |
| 6,986,132 B1 | 1/2006 | Schwabe | |
| 7,536,590 B2 * | 5/2009 | Okeda et al. | 714/11 |
| 2004/0015947 A1 | 1/2004 | Gong et al. | |

FOREIGN PATENT DOCUMENTS

| | | |
|---|---|---|
| WO | 0077583 A1 | 12/2000 |
| WO | 03027850 A2 | 4/2003 |

OTHER PUBLICATIONS

International Search Report, Jun. 19, 2007 (3 pages). Hoffman; "A Taxonomy for Test Oracles (90 minute presentation)"; Quality Weekly 1998 Proposal; Jan. 16, 1998; 4 pages.
Supplementary European Search Report; Application No. EP 07 70 9390; May 6, 2010 (Mailing Date: May 17, 2010); 10 pages.
International Preliminary Report on Patentability and Written Opinion of the International Searching Authority; PCT/SE2007/000187; Sep. 2, 2008; 6 pages.

* cited by examiner

*Primary Examiner* — Kakali Chaki
*Assistant Examiner* — Tejal Gami
(74) *Attorney, Agent, or Firm* — St. Onge Steward Johnston & Reens LLC

(57) ABSTRACT

The invention relates to a method for comparing variable values obtained from different versions of an application program in an automated system. An input signal obtained from an automated process is inputted to at least two different versions of the application program residing within a same controller. The same tasks are executed based on the input signal for the different versions, and process related variable values obtained from the execution of the versions are stored in memory locations known by the controller. Variable values from the different versions and derived from corresponding execution steps of the versions are retrieved from the memory locations, and compared during an idle time. An improved way of revising an automation system is thereby achieved. The invention also relates to such controller and an automation system.

11 Claims, 3 Drawing Sheets

METHOD FOR COMPARING, AN AUTOMATION SYSTEM AND A CONTROLLER

CROSS-REFERENCE TO RELATED APPLICATIONS

The present application is a continuation of pending International patent application PCT/SE2007/000187 filed on Feb. 28, 2007 which designates the United States and claims priority from Swedish patent application 0600449-3 filed on Mar. 2, 2006, the content of which is incorporated herein by reference.

FIELD OF THE INVENTION

The invention relates to the field of automation, and in particular to a method for comparing variable values obtained from different versions of an application program within an automation system as defined in the preamble of claim 1, to an automation system as defined in the preamble of claim 7, and to a controller as defined in the preamble of claim 10.

BACKGROUND OF THE INVENTION

Automatic control or automation is very important within industrial production, for example in order to eliminate monotonous tasks and lessen hazardous elements in a production line. In general automation also increases the efficiency as well as the quality of a process and is an excellent means to meet today's demands for non-environmental influence and economical production.

Today, most process industries such as food processing, energy or power generating plants, pharmaceutical and chemical industries are indeed more or less automated, that is, have automatic, computerised control, operation and management. The programme code used in these computerized machines and processes are subject to continuous development in order to meet changing demands. Regular updates of system software are therefore necessary for improving existing routines as well as for correcting shortcomings of the routines used.

When such updates are to be made, the version presently being used is overwritten by the new, upgraded version. This can bring about serious problems should the new version not be adequately downloaded, if the new version contains bugs or if it is non-functioning or if it contains unforeseeable incompatibilities with the system, for example leading to instabilities within the system. Should a need to revert to the old version arise, this previous code has to be downloaded again. The production could then possibly halt until the old version is up and running again. Such interruptions in production are very expensive, or could even, depending on the industry in question, be dangerous.

SUMMARY OF THE INVENTION

An improved way to perform an upgrading of a version of an application or application program is to execute two versions in the same controller, as is described in the co-pending patent application entitled "Method for evaluating, an automation system, and a controller", assigned to the same applicant and filed on the same day as the present invention.

It is an object of the present invention to provide a method for ensuring that when executing two versions of an application program in the same controller and performing comparisons of the values output from the different versions, there are no interruptions or disturbances of an ongoing execution of controller applications.

It is another object of the invention to provide an efficient way of performing the comparisons. More specifically, it is an object to provide a method that does not in any way affect the on-going processes or steal processing time or capacity from the important task scans.

These objects, among others, are achieved by a method as claimed in claim 1, by a system as claimed in claim 7, and by a controller as claimed in claim 10.

In accordance with the present invention a method for comparing variable values obtained from different versions of an application program in an automated system is provided. The system within which the method can be implemented comprises a controller for automation of a process by means of the application program stored therein. At least two different versions of the application program are stored within the same controller. The method comprises the steps of: inputting to all different versions of the application program an input signal obtained from the process; executing, in the controller, the same tasks based on the input signal for the different versions; storing in memory locations process related variable values obtained from the execution of the different versions, wherein the memory locations are known by the controller; retrieving from the memory locations variable values from the different versions, wherein the retrieved variable values are derived from corresponding execution steps of the different versions; and comparing the retrieved variable values when the controller is idle. A new upgraded version of an application can be executed concurrently with a currently used version and evaluated under true production circumstances utilising real input signals, and thereby eliminating the risk of shutdowns of the production. By means of the invention the comparisons are made when the controller is idle, whereby the execution of the application program is not disturbed and the on-going processes are not affected. Further, by means of the invention it is ensured that purposeful comparisons are made, since the values to compare are guaranteed to be from the same task scan.

In accordance with an embodiment of the invention the comparisons of the retrieved variable values are performed in-between task scans. There is usually some idle time during task scans, whereby this is a suitable period of time for performing the comparisons.

In accordance with another embodiment of the invention the comparisons are halted when a new task scan is about to start, and if there is not enough idle time to run all the variable values, the comparisons are resumed during a subsequent idle time. By means of this feature all the variable values that should be compared are compared cyclically. This is another aspect of ensuring that process related tasks are not interfered with and no disturbances in the production are imposed due to the comparisons.

In accordance with still another embodiment of the invention, it is possible to store differing variable values, if such differences are found, at a separate memory location. It is thereby possible to establish a complete list of all registered differing variable values, should such need exist. For example, the user is able to determine if the differing values are converging, diverging or possibly staying at a constant difference and thereby determine if one of the versions are malfunctioning and need revision.

In accordance with yet another embodiment of the invention, the method further comprises the step of presenting found differences to a user. This presentation can be accomplished in any desired manner, such as for example in the form of graphs, numbers or diagrams.

In accordance with still another embodiment of the invention, the comparisons of the different versions are performed in order to establish the functionality of a new version of the application under real process circumstances. Other applications of the invention are also conceivable, such as tracing faults or the like. The invention thus provides a general method for evaluation applicable for different purposes.

The invention is also related to an automation system and a controller, whereby advantages corresponding to the above described are achieved.

DETAILED DESCRIPTION OF THE INVENTION

One way to improve the upgrading of a version of an application controlling a process is to execute two versions in sequence or in a quasi-parallel manner in a single controller, as is described in the co-pending patent application entitled "Method for evaluating, an automation system, and a controller", assigned to the same applicant as the present application and incorporated herein by reference. In short, in accordance with the reference co-pending patent application, a method for evaluating an application used for controlling a process within an automation system is provided. Two or more application programs reside within the same controller and an input signal obtained from the process is input to all of them. One of the application versions is controlling the process while the others are not. The same tasks are executed in the controller based on the input signal for all of the different versions of the application. Thereafter a report is generated comprising comparisons of the outputs generated by the different versions of the application. Finally, the version(s) not used for controlling the process are evaluated based on the generated report. Since the different versions of the control program are executed in sequence in the same controller and under identical circumstances the behaviour of the different versions can be compared before the new version is deployed. It is thereby ensured that a new version truly is functioning in a real environment before it is launched, and expensive production stoppages can be avoided. Should a comparison show somehow contrary results, for example the different versions indicating opposite switching operations to be performed, the new version can easily be revised before being finally installed. An improved way of revising an automation system is thereby achieved.

However, when two or more application programs are executed in sequence or in a quasi-parallel manner, it is important to perform the comparisons in an efficient way. More specifically, the comparisons should not in any way affect the on-going processes or steal processing time or capacity from the important task scans. The present invention provides a method accomplishing this.

Figure 1:
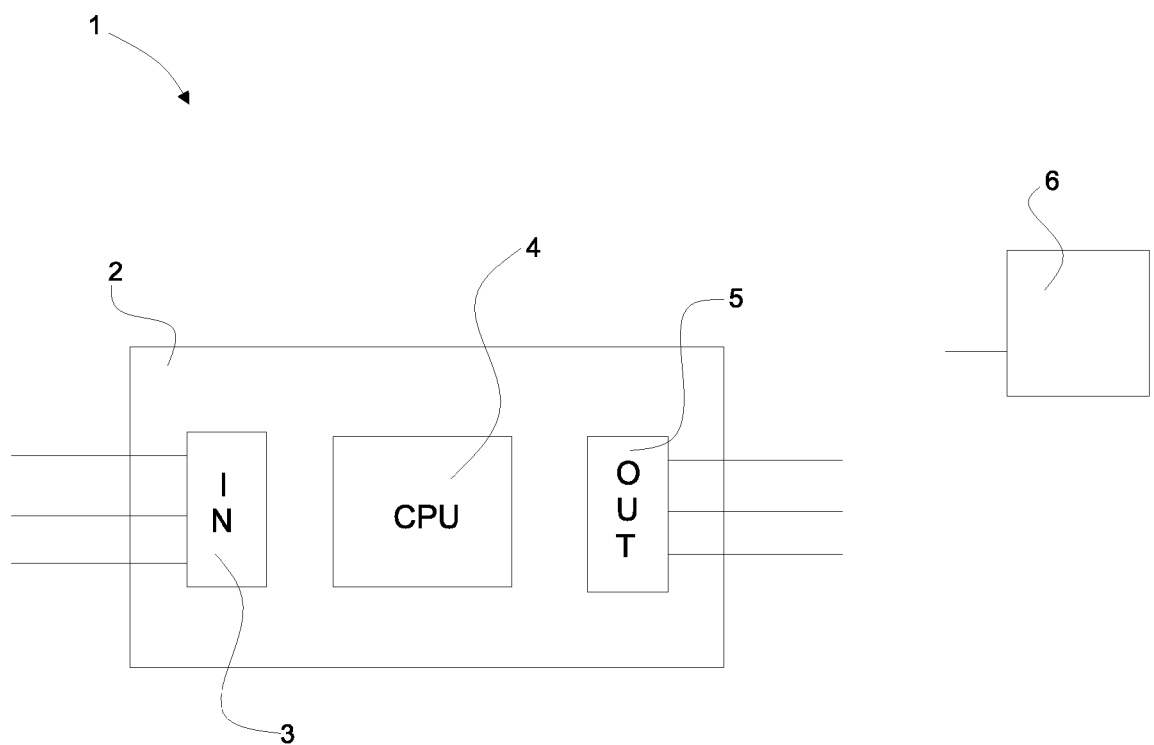
FIG. 1 illustrates schematically an automation system.

FIG. 1 shows a very schematic outline of an automation system 1, comprising one or more controllers 2 controlling some processes 6 within the system 1. The controller 2 may be any suitable controller, such as for example a process controller or a programmable logic controller (PLC). The controller 2 comprises an Input/Output arrangement 3, 5 for inputting and outputting process related variables in order to control the system 1. The controller 2 further comprises a central processing unit (CPU) executing the instructions of the control programs, and a memory for storing instructions and data. The CPU is also responsible for communication with other devices (not shown) and the execution of the control applications.

FIG. 1 shows a very schematic outline of an automation system 1, comprising one or more controllers 2 controlling some processes 6 within the system 1. The controller 2 comprises an Input/Output arrangement 3, 5 for inputting and outputting, process related variables in order to control the system 1. The CPU is also responsible for communication with other devices (not shown) and the execution of the control applications.

A control program or application cyclically reads the values of process inputs and external variables (for example values from another controller), performs calculations based on these values and also on the values of internal variables (for example values obtained during processing or internal states) and generates as a result values to process outputs and also to external variables. Each such execution is called a scan cycle or task scan. The controller comprises a central processing unit (CPU) storing and executing the instructions of the control programs. The CPU is also responsible for the communication with other devices and the execution of the control programs.

As mentioned earlier, at least two different versions $V_{old}$, $V_{new}$ of an application program are downloaded to the controller. For convenience only two versions are used in the following to describe the invention, but it is understood that several versions could equally well be used. Both versions of the application, $V_{new}$ and $V_{old}$, are stored in the controller, and an input signal from an I/O unit is copied to them both. The input signal is processed by both versions and respective output signal values are stored in two respective memory locations. The output signal value from the currently used version, usually the old version, is copied back to the I/O unit and used for controlling the process. By running both versions simultaneously for the same task, it is ensured that the comparison is accurate and that the values are actually comparable, i.e. are from the same task scan.

Values received when executing the different versions $V_{old}$, $V_{new}$ of the application can now be compared in order to verify the functionality of the version controlling the controller and thus the functionality of the controller. That is, by comparing the variable values, differences can be detected and evaluated, and thereby the functionality of the new version $V_{new}$ can be determined. The operator or user can compare the two versions $V_{old}$, $V_{new}$, and depending on the result either continues or aborts an installation of the new version $V_{new}$.

The controller knows or is made aware of the memory locations of each variable value, i.e. the locations of each variable value are programmed into the controller. If arbitrary values are to be compared, information about their memory locations has to be generated and sent to the controller together with the application program. In accordance with the invention, the controller knows the memory locations of variables such as variables connected to the I/O arrangement, access variables and alarms. Memory locations of other variables, such as SFC steps represented by a variable, will be generated elsewhere, preferably in an engineering tool (where the applications are created), and should be sent to the controller together with the application program. If values from two versions of the same application program should be compared, then the controller does not in general need information about which pairs of values to compare. However, should the user want to make other, non-obvious, comparisons, information about which pairs of values to compare and their respective memory locations must be generated in the engineering tool. Since the controller knows the location of the variable values for each respective version there is no risk for confusion caused by variables of the two versions, and there are no resulting disturbances in the process.

Now, knowing the memory locations of the variables, and knowing which variables to compare, a background subsystem in the controller traverses the structures for everything that should be compared. Two values to be compared are fetched, i.e. retrieved from their respective memory locations, and the comparison is made. For analogue values, a so-called "deadband" is used, that is, the values are not considered to differ if they are within such deadband. This is done in order for the controller not to react on signal noise. The deadband could be set as a certain percentage, for example if the difference between the values are within 0.5% no difference is reported. The deadband could alternatively be implemented as predetermined absolute values. Preferably, if the values differ they are copied and stored in a separate structure. All the processing related to the comparisons is made as an atomic operation, i.e. the operation must not be interrupted. This in order to guarantee that the values compared originates from the same task scan.

In another embodiment the values obtained from the one or more "dummy" or passive versions are not compared to the values obtained from the version controlling the process. Instead, the values from the passive version are compared with predetermined values, for example desired target values.

Figure 2:
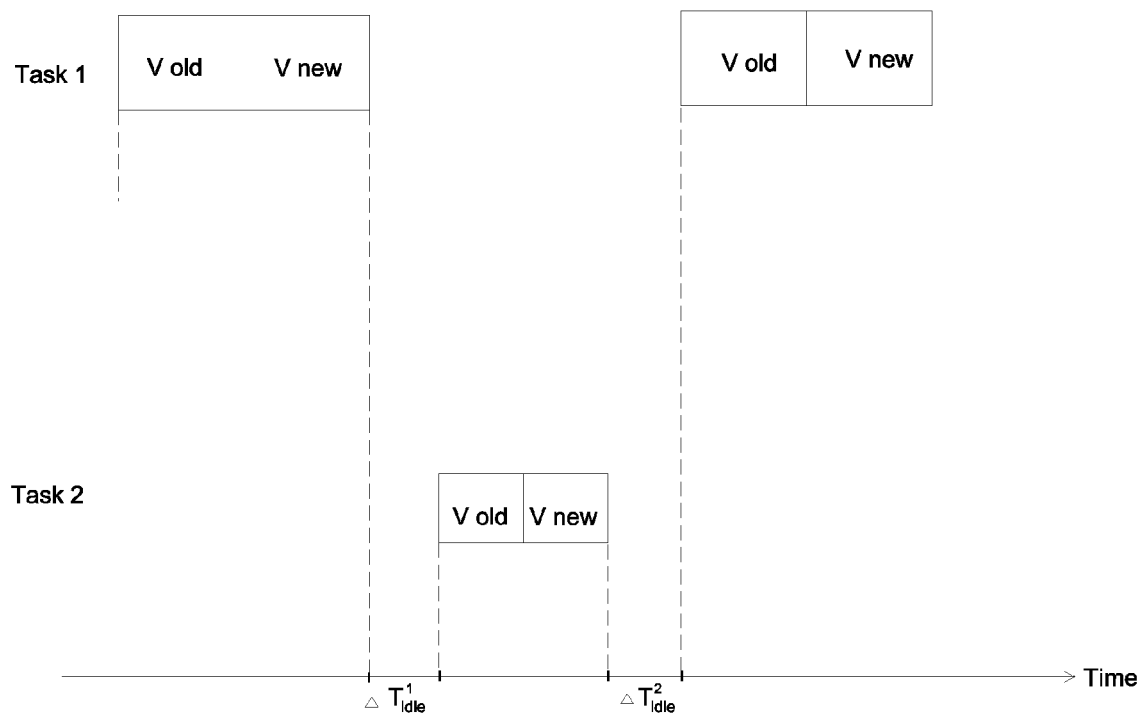
FIG. 2 illustrates schematically the execution of different applications in a time scale.

In FIG. 2 the execution of two different tasks and their mutual time relation are illustrated. The two versions of an application are executed and the values stored as described above. Then another task may be performed before a next cycle for the first task is performed. It is understood that many more tasks than the two that have been illustrated can be performed, and is usually performed. Further, tasks could be overlapping each other, i.e. a certain task can be interrupted midways should another task, having a higher priority, be scheduled to be executed. There are however short idle-times, $\Delta T_{idle}^1$ and $\Delta T_{idle}^2$, between tasks, during which a comparison in accordance with the invention can be performed. By performing the comparisons in-between task scans, that is, when the controller is idle, no interruptions of the tasks are made and the processes are not affected by the processing of the values. All tasks have preferably a higher priority than such comparisons, since they relate to an ongoing process.

There may not be enough time during a single idle-time, for example $\Delta T_{idle}^1$, to compare all the stored values or pairs of variable values. The comparisons then continue during next idle-time $\Delta T_{idle}^2$, and preferably from the last compared pair of values. Stated differently, as long as a new task scan is not about to start the values are compared, and when a new task scan is about to start the comparisons are halted until a new idle-time occurs. When the next idle-time starts the comparisons are continued were they were halted. In this way all pairs of variable values that should be compared are compared cyclically.

If the comparison of two values shows that they differ these values can be compared more often than other values, since it is usually very likely that these values will continue to differ. This can be done by putting the differing variable pairs in a special list, a high-intention list, which will be traversed more often than the entire structure of variable pairs.

Usually, when a certain task is performed the corresponding values are stored at certain memory locations, and when the same task is performed the next time, the values are overwritten with new values. In an embodiment, the values from a task scan are stored at another memory location as well, thereby enabling a history or record to be stored. A user can then determine if the values are diverging, converging or if they remain at a same difference and take appropriate actions.

The comparisons are preferably made in the controller, whereby the communication load between the controller and an operator's work station, such as a PC or the like, will be significantly less than if the values should be compared in the PC. Communication of the values that differ is also made in-between task scans in order not to disturb the execution of the applications.

When differences have been found in the controller they should be presented to the user of the system. The values that have been found to differ are packed or coded into communication telegrams or packages, enabling a transmission to a PC on request, or automatically. Should a particularly alarming difference occur it is possible to display it highlighted, for example present it as flashing values or triggering an audible alarm.

In an alternate embodiment all values are stored, packed and displayed to the user.

The most crucial values of an application are the values that affect the surroundings of the application and in particular the process, i.e. values of variables connected to I/O output channels, conditions to alarm objects, values of variables connected to access variables (that is, communication variables visible and accessible from other applications), and state of SFC-steps. However, it is understood that any values in the applications could be compared. The comparison of values from different versions of an application can also be used in fault tracing.

Figure 3:
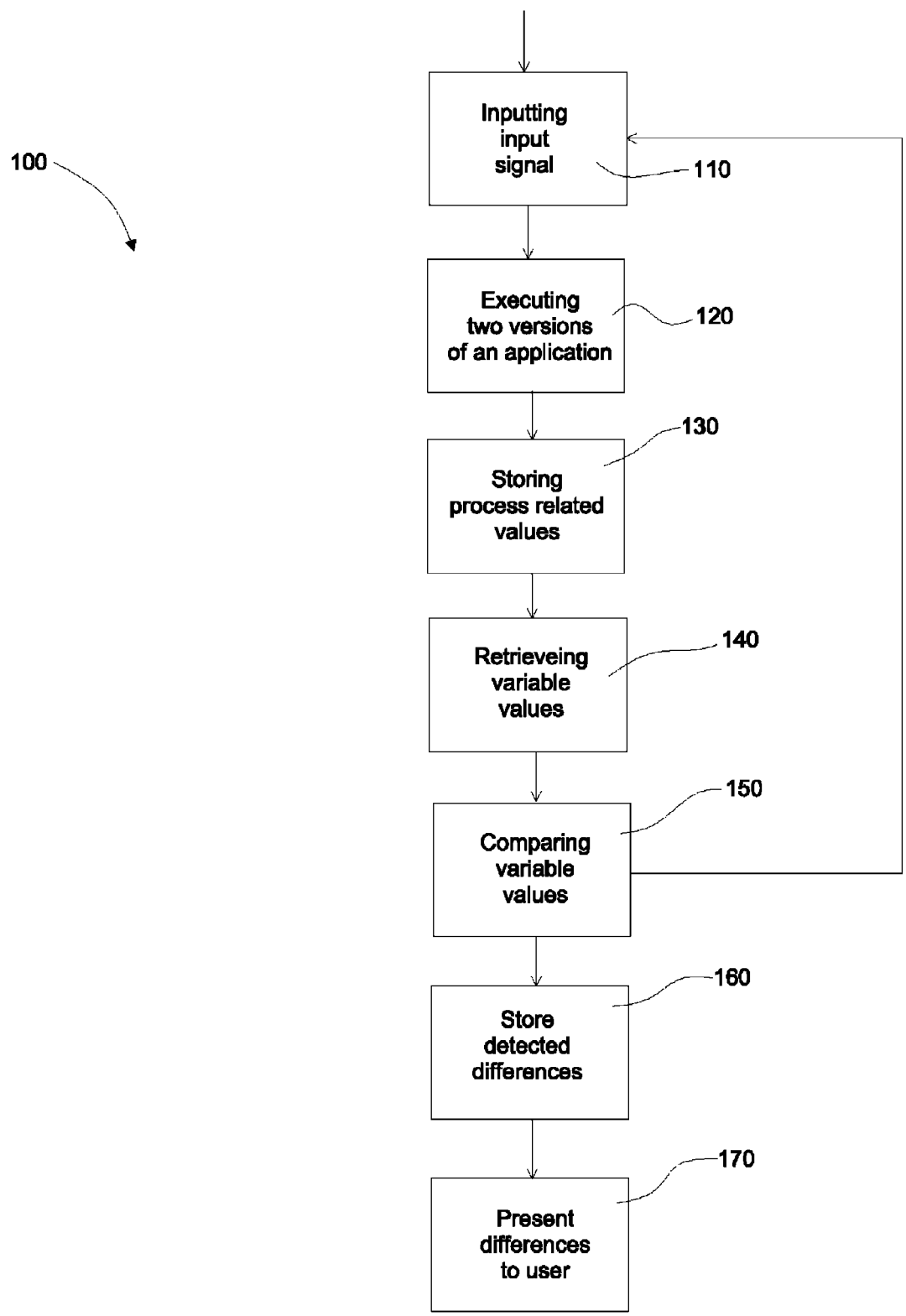
FIG. 3 shows a flowchart of the steps included in an embodiment of the method in accordance with the present invention.

In FIG. 3 a summation of the steps included in the method according to the present invention is shown in a flowchart. It is to be understood that all steps are not necessary included. The method 100 for evaluating an application controlling a process within an automation system starts with the inputting of input signals to the different versions of an application, step 110. Next, the execution 120 of the two versions of the application is made. This is performed in the controller and the execution of both versions is performed in sequence for both versions. Next, process related variable values obtained from the execution of the two versions are stored 130 in memory locations. In the next step, variable values from the different versions are retrieved 140 from the memory locations. Thereafter, the retrieved variable values are compared 150. Usually, the variable values to be compared are variable values derived from corresponding execution steps of the different versions, but any pair of values could of course be compared. After the step of comparing it is determined if the values differs and any detected differences are stored 160 in another, separate memory location. Finally the differences are presented 170 to a user, whereby the user may decide whether to abort the new version or continue and replace the current version with it, the decision thus being based on whether the differences are acceptable or not. It is thereby ensured that a new version truly is functioning in a real environment before it is launched, and expensive production stoppages can be avoided. Should a comparison show somehow contrary results, for example the different versions indicating opposite switching operations to be performed, the new version can easily be revised before being finally installed.

In the description two versions of an application have been described, but three or more versions could be performed in an alternate embodiment. For example, if there are two different new versions, $V_{new\ 1}$ and $V_{new\ 2}$, one of them intended to replace a current version of an application, all three versions could be run in parallel, i.e. the two versions $V_{new\ 1}$, $V_{new\ 2}$ and the currently used one $V_{old}$.

In summary, the inventive method provides an efficient way to compare process related variable values when executing different versions in the same controller. The presented method for comparing values and generating a difference report does not disturb the on-going processes, since they are made in-between task scans and do not take capacity within the controller when such capacity is needed for the processes. The method further describes how to organize and retrieve the data in a suitable way.

An improved way of revising an automation system is thereby achieved.

What is claimed is:

1. A method for comparing variable values obtained from different versions of an application program in an automated system, said system comprising a controller for automation of a process by means of the application program stored therein, the application program cyclically performing task scans based on an input signal, characterised in that the method comprises the steps of:
   inputting to at least two different versions of the application program, which versions reside within the same controller, the input signal obtained from said process,
   executing, in the controller, the same task scan based on said input signal for the at least two different versions of the application program,
   storing in memory locations process related variable values obtained from the execution of said at least two versions, said memory locations being known by the controller,
   retrieving from the memory locations the variable values, and
   comparing the variable values for differences when said controller is idle, the comparison being made as an atomic operation in-between task scans.

2. The method according to claim 1, wherein said step of comparing is halted when a new task scan is about to start, and resumed where halted when the controller is again idle.

3. The method according to claim 1, further comprising, if differences between the variable values from the different versions are found, the step of storing the differing variable values at a separate memory location.

4. The method according to claim 1, wherein said method further comprises the step of presenting found differences to a user.

5. The method according to claim 1, wherein said comparison is performed in order to establish the functionality of a new version of the application under real process circumstances.

6. An automation system comprising a controller, said controller having stored therein an application for controlling a process within the automation system, the application program cyclically performing task scans based on an input signal, characterised in that the system comprises:
   means for inputting to at least two different versions of the application, which versions reside within the controller, an input signal obtained from said process,
   means for executing, in the controller, a task scan corresponding to said input signal for each of the at least two different versions of the application in parallel, each said version of the application outputting a variable value,
   means for storing in memory locations the variable values obtained from the execution of the task scan for each of said at least two versions, said memory locations being known by the controller,
   means for retrieving from the memory locations the variable values from the different versions of the application, and
   means for comparing said retrieved variable values and determining if differences exists between the variable values when the controller is idle, the comparisons being made as an atomic operation in-between task scans.

7. The automation system according to claim 6, further comprising means for storing at further memory locations determined differences in the variable values.

8. The automation system according to claim 6, further comprising means for presenting the differences to a user.

9. A controller for controlling processes within an automation system, said controller comprising an application and an input/output arrangement, the application program cyclically performing task scans based on an input signal, characterised in that said controller comprises:
   at least two different versions of said application, said versions being arranged to receive the same data from said input/output arrangement,
   means for executing the same task scan based on said input signal for the at least two different versions of the application program, each version outputting a variable value based on said input signal,
   means for storing in memory locations the variable values obtained from the execution of said at least two versions, said memory locations being known by the controller,
   means for retrieving from the memory locations the variable values from the different versions, and
   means for comparing the variable values when said controller is idle, the comparison being made as an atomic operation in-between tasks.

10. The controller according to claim 9, wherein said input/output arrangement comprises connections connecting said controller to sensors and actuators located within said automation system and related to processes therein.

11. The automation system according to claim 7, further comprising means for presenting the differences to a user.

* * * * *